No. 681,884. Patented Sept. 3, 1901.
C. MONJEAU.
PURIFYING WATER.
(Application filed Dec. 18, 1900.)
(No Model.)
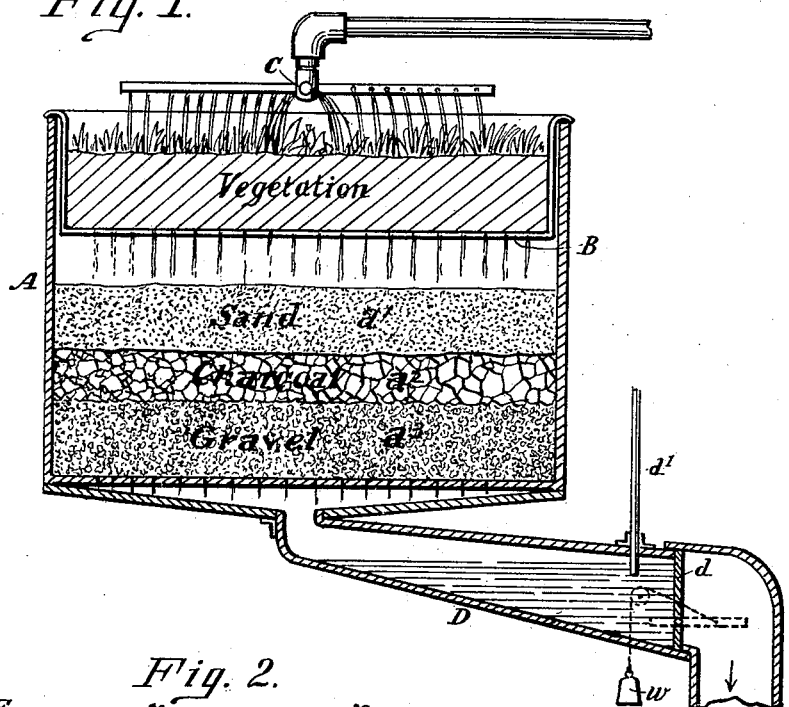
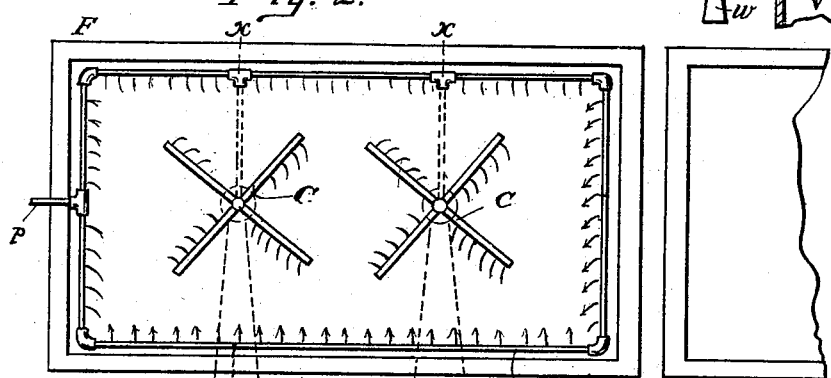
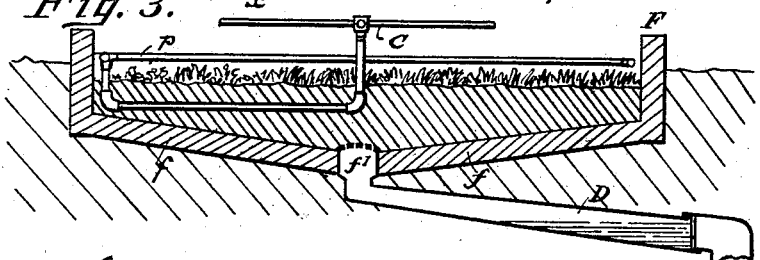
Witnesses
Walter A. Knight
Chas. Hubert Jones
Inventor
Cleophas Monjeau
by L. M. Hosea Atty.
THE NORRIS PETERS CO., PHOTO-LITHO., WASHINGTON, D. C.

UNITED STATES PATENT OFFICE.

CLEOPHAS MONJEAU, OF MIDDLETOWN, OHIO.

PURIFYING WATER.

SPECIFICATION forming part of Letters Patent No. 681,884, dated September 3, 1901.

Application filed December 18, 1900. Serial No. 40,241. (No specimens.)

*To all whom it may concern:*

Be it known that I, CLEOPHAS MONJEAU, a citizen of the United States, residing at Middletown, in the county of Butler and State of Ohio, have invented new and useful Improvements in the Purification of Water, of which the following is a specification.

My invention relates to the purification of water for drinking and other purposes appertaining to human needs, and is based upon the discovery that growing vegetation under proper circumstances extracts from water a class of bacteria injurious to the animal, and particularly the human organism. Where nature's conditions exist undisturbed, the earth is for the most part covered with vegetation, most prolific where rains are most copious and frequent. The rain falling upon the trees of the forest trickles to the ground and soaks through the covering of dead leaves. In open spaces it falls upon the grass and sinks into the earth around and amid the grass-roots. In nearly all places it thus meets and is modified by vegetation, particularly by the roots of plants, around and among which the water percolates downward to the hidden reservoirs of springs.

My invention seeks to artificially reproduce nature's conditions as far as practicable in the purification of water, particularly in connection with the water-supply of cities and villages where an abundant supply of potable water is a desideratum of highest value to the community; and it consists in the process hereinafter described and claimed of purifying water whereby bacteria injurious to the animal economy are taken up or modified.

In the drawings herewith I have shown this construction in simplest forms, which are suggestive merely, and may be varied or modified without departing from the underlying principle.

In the drawings, Figure 1 is a sectional elevation of a filter and purifier combined, embodying a means of carrying out my improvement; Fig. 2, a plan view of a portion of an out-of-door "purifying-ground," showing principle of construction; and Fig. 3, a section on line $xx$ further illustrative of the construction.

Referring now to the drawings, the apparatus shown in Fig. 1 is a filtering device designed to be used in connection with the water-supply of buildings for the purification of a comparatively small amount of water. It consists of a tank A, preferably of cylindrical form, containing the usual filtering-layers $a'$ $a^2$ $a^3$, &c., of sand, coarse gravel, charcoal, &c., and at or near the top a removable perforated tray B, containing vegetation in a growing state bedded in a suitable earthy medium to maintain the same in a state of growth. The character of vegetation need not be here particularized further than to state that grasses and plants, especially those of a semi-amphibious nature, are best adapted to the purpose. Several similar trays should be provided and interchanged frequently with the one in immediate use, so that the vegetation may not be destroyed, and when not in actual use may be recuperated by abundant sunlight, air exposure, and other favoring conditions of healthy growth.

The water is preferably delivered to the filter in a multitude of minute streams discharged from a "rose-nozzle" or system C of radially-arranged minutely-perforated pipes in the manner of a shower of rain from above upon the bed of vegetation contained in the tray B. The water thus discharged trickles down through the bed of vegetation and thence passes through the filtering-layers $a'$ $a^2$, &c., to the discharge-pipe D at the bottom. The latter is constructed as a downwardly-inclined passage controlled at the discharge end by an eccentrically-pivoted flap-valve $d$, and has an air-inlet tube $d'$ entering the passage just inside the valve, with its mouth projecting below the level at which the height of water accumulating in the passage would overbalance and open the valve against the force of a weight $w$, tending to keep the same closed. The action of this portion of the device is as follows: Water passing down through the filter accumulates in the outlet-passage D until it rises to a sufficient height to overbalance and open the valve $d$, and so empty the passage. This action draws air through the tube $d'$ into the passage to take the place of the discharged air. The water being discharged, the valve $d$ is again closed by the action of the weight $w$, and as the water rises it seals the mouth of the tube $d'$, and as it further accumulates it forces the excess of contained air back into the filter. Thus as the water descends through the filtering material air ascends, being partially absorbed by the descending water, thereby aiding in its purification and in the purification of the filtering material. There is thus constituted a simple and effective method of purifying the water in which the initial step is the action of the vegetation through which the water is passed and later further purification by the filtering and aeration described.

Figs. 2 and 3 illustrate an apparatus adapted for use on a large scale, consisting of a number of shallow basins F, usually of considerable size, one of which is shown in plan and cross-section in the figures. Each basin is arranged with impervious bottom $f$, inclined to a central depression $f'$, from which the outflow-passage D leads, constructed and arranged substantially as in the first-described instance. The basin is filled with earthy material arranged upon a bed of sand or gravel and containing a growth of vegetation rooted therein. The action is substantially the same as in the case previously described, the water being distributed over the surface by pipes $p$, carried around the sides above the vegetation, and discharging inwardly through minute perforations or through rotating "sprayers" C, arranged at suitable points. It is intended that a number of such basins shall be employed in series and so arranged that any one or more can be temporarily disused when necessary for cleansing, renewal of the vegetation, &c., without interfering with the use of others in the series.

I claim as my invention and desire to secure by Letters Patent of the United States—

1. The process of purifying water for potable uses consisting in spraying the same over artificially-prepared beds of vegetation and allowing the water to percolate through the same, and at the same time aerating the water.

2. The process of purifying water for potable uses consisting in spraying the same over artificially-prepared beds of vegetation and allowing the water to percolate through the same and thence through a bed or beds of filtering material, and coincidently therewith aerating the water.

3. The process of purifying water for potable uses consisting in spraying the same over artificially-prepared beds of vegetation and allowing the water to percolate through the same and thence through a bed or beds of filtering material, and at the same time aerating by passing air upward through said beds, substantially as specified.

4. The process of purifying water and rendering the same potable, consisting in passing the same downward over or through a bed of growing vegetation as an initial step in filtration, and, coincidently therewith, introducing atmospheric air and allowing the same to pass upward through the bed of vegetation, substantially as set forth.

5. The process of artificially effecting the equivalent of such natural purification of polluted water or waters by causing the same to percolate through duly-interposed living vegetation and particularly the roots thereof, and thence through a bed or beds of filtering material, collecting the water for use, and aerating the water by an upward current of air.

In testimony whereof I have hereunto set my hand in presence of two subscribing witnesses.

CLEOPHAS MONJEAU.

Witnesses:
L. M. HOSEA,
WALTER A. KNIGHT.